United States Patent
Panamarathupalayam

(10) Patent No.: US 11,795,366 B2
(45) Date of Patent: Oct. 24, 2023

(54) HIGH-TEMPERATURE FLUIDS FOR COILED TUBING APPLICATIONS AND METHODS THEREOF

(71) Applicant: M-I L.L.C., Houston, TX (US)

(72) Inventor: Balakrishnan Panamarathupalayam, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 13 days.

(21) Appl. No.: 16/652,393

(22) PCT Filed: Nov. 28, 2018

(86) PCT No.: PCT/US2018/062683
§ 371 (c)(1),
(2) Date: Mar. 30, 2020

(87) PCT Pub. No.: WO2019/108560
PCT Pub. Date: Jun. 6, 2019

(65) Prior Publication Data
US 2020/0299565 A1  Sep. 24, 2020

Related U.S. Application Data

(60) Provisional application No. 62/592,134, filed on Nov. 29, 2017.

(51) Int. Cl.
*C09K 8/512* (2006.01)
*C08F 220/56* (2006.01)
*E21B 17/22* (2006.01)

(52) U.S. Cl.
CPC .............. *C09K 8/512* (2013.01); *E21B 17/22* (2013.01); *C08F 220/56* (2013.01)

(58) Field of Classification Search
CPC .......... C09K 8/12; C09K 8/035; C09K 8/512; C09K 8/5086; C09K 2208/26; E21B 17/22; Y10S 507/903
See application file for complete search history.

(56) References Cited

U.S. PATENT DOCUMENTS

| 4,779,680 A | 10/1988 | Sydansk | |
|---|---|---|---|
| 6,131,661 A * | 10/2000 | Conner | C09K 8/08 166/300 |
| 2004/0132626 A1* | 7/2004 | Guzman | C09K 8/08 507/104 |
| 2014/0121136 A1* | 5/2014 | Mirakyan | C09K 8/685 507/201 |
| 2015/0191640 A1* | 7/2015 | Lee | C09K 8/24 507/121 |
| 2016/0376488 A1* | 12/2016 | Galindo | E21B 7/00 175/65 |
| 2017/0199296 A1 | 7/2017 | Panamarathupalayam et al. | |

FOREIGN PATENT DOCUMENTS

WO  2016/043977 A1  3/2016
WO  2017/120499 A1  7/2017

OTHER PUBLICATIONS

International Search Report and Written Opinion for the counterpart International patent application PCT/US2018/062683 dated Mar. 28, 2019.
First Substantive Examination Report issued in Saudi Arabia Patent Application 520412073 dated Nov. 11, 2022, 11 pages.
Second Substantive Examination Report issued in Saudi Arabia Patent Application No. 520412073 dated May 1, 2023, 9 pages.

* cited by examiner

*Primary Examiner* — Aiqun Li
(74) *Attorney, Agent, or Firm* — Jeffrey D. Frantz

(57) ABSTRACT

A coiled tubing wellbore fluid may include a base fluid; and a crosslinked and branched polymeric fluid loss control agent formed from at least an acrylamide monomer and a sulfonated anionic monomer; wherein the coiled tubing wellbore fluid has a low shear rate viscosity, measured at 120° F. at 3 rpm, of at least 20,000 centipoise.

4 Claims, No Drawings

HIGH-TEMPERATURE FLUIDS FOR COILED TUBING APPLICATIONS AND METHODS THEREOF

This application claims the benefit of U.S. Provisional Application having Ser. No. 62/592,134 filed on Nov. 29, 2017, the entire contents of which are incorporated herein by reference in their entirety.

BACKGROUND

During the drilling of a wellbore, various fluids are used in the well for a variety of functions. The fluids may be circulated through a drill pipe and drill bit into the wellbore, and then may subsequently flow upward through wellbore to the surface. During this circulation, a drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

However, another wellbore fluid used in the wellbore following the drilling operation is a completion fluid. Completion fluids broadly refer to any fluid pumped down a well after drilling operations have been completed, including fluids introduced during acidizing, perforating, fracturing, workover operations, etc. Reservoir drill-in fluid (RDF) is a specific type of drilling fluid that is designed to drill and complete the reservoir section of a well in an open hole, i.e., the "producing" part of the formation. Such fluids are designed to balance the properties of the reservoir with drilling and completion processes. In particular, it is desirable to protect the formation from damage and fluid loss, and not impede future production. Many RDFs contain several solid materials including viscosifiers, drill solids, and additives used as bridging agents to prevent lost circulation.

During drilling, a filter cake may build up on the walls of a wellbore in which varying sizes and types of particles accumulate. This filter cake may be removed during the initial state of production, either physically, through washing action of circulating fluids, or by using chemical treatments, e.g., acids, oxidizers, enzymes, and the like. The amount and type of drill solids present in the filter cake may also affect the effectiveness of clean up treatments, in addition to the presence of polymeric additives that may be resistant to degradation using chemical treatments.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a coiled tubing wellbore fluid that includes a base fluid; and a crosslinked and branched polymeric fluid loss control agent formed from at least an acrylamide monomer and a sulfonated anionic monomer; wherein the coiled tubing wellbore fluid has a low shear rate viscosity, measured at 120° F. at 3 rpm, of at least 20,000 centipoise.

In another aspect, embodiments disclosed herein relate to a method of drilling by coiled tubing that includes extending a coiled tubing with a drill bit at the end thereof through a production string extending through a wellbore; pumping a wellbore fluid through the coiled tubing, and drilling a wellbore using the drill bit at the end of the coiled tubing during the pumping, where the wellbore fluid includes a base fluid; and a crosslinked and branched polymeric fluid loss control agent formed from at least an acrylamide monomer and a sulfonated anionic monomer; and wherein the coiled tubing wellbore fluid has a low shear rate viscosity, measured at 120° F. at 3 rpm, of at least 20,000 centipoise.

In another aspect, embodiments disclosed herein relate to a method of drilling by coiled tubing that includes extending a coiled tubing with a drill bit at the end thereof through a production string extending through a wellbore; pumping a wellbore fluid through the coiled tubing, and drilling a wellbore using the drill bit at the end of the coiled tubing during the pumping, where the wellbore fluid includes a base fluid; and a crosslinked and branched polymeric fluid loss control agent formed from at least an acrylamide monomer and a sulfonated anionic monomer; and wherein the coiled tubing wellbore fluid has a solid content of less than 2 wt %.

Other aspects and advantages of the claimed subject matter will be apparent from the following description and the appended claims.

DETAILED DESCRIPTION

In one aspect, embodiments disclosed herein relate to fluids for and methods of drilling with coiled tubing. In particular, the fluids may include wellbore fluid additives for downhole applications such as mitigation of fluid loss and maintenance of fluid viscosity. Wellbore fluids in accordance with the present disclosure may contain chemically crosslinked and branched polymeric fluid loss additives, including branched and crosslinked copolymers of acrylamide and a sulfonated anionic monomer. In some embodiments, wellbore fluid additives in accordance with the present disclosure may be used in high temperature high pressure (HTHP) applications and may impart stable viscosity and gel strength when used in wellbore fluid formulations under extreme conditions.

In coiled tubing drilling, the coiled tubing extends through the production tubing that is already placed in the well so that the well can be worked over, such as to extend the well or form a sidetrack. That is, the well, generally having been in production, is desired to be worked over. Rather than pulling the production tubing, a coiled tubing (and drill bit) is inserted into the well, through the production tubing to continue drilling operations. The present disclosure is directed to fluids for such coiled drilling operations.

Wellbore fluids in accordance with the present disclosure may contain polymeric fluid loss control additives that withstand HTHP conditions, yet clean up with breaker fluids and be suitable for coiled tubing drilling applications. During standard wellbore operation, wellbore fluids are often formulated with a number of polymeric additives to tune the viscosity and gel strength of the fluid such that wellbore fluids maintain the ability to suspend particulate additives and drill cuttings, particularly when circulation is stopped. In coiled tubing operations, the small size of the coiled tubing (and annulus) provides distinct limitations on a drilling fluid. Whereas a conventional drilling fluid may seek to prevent fluid loss by the formation of a filtercake, the present fluid loss mechanism for coiled tubing drilling seeks to use the low shear rate viscosity (LSRV) of the fluid to prevent, reduce or minimize the fluid loss during the coiled tubing drilling operation.

However, generally rheological characteristics of wellbore fluids may be difficult to control because of the adverse conditions under which wellbore fluids are used, including high temperature, high shear (caused by the pumping and placement), high pressures, and low pH. For example, when drilling of certain deep wells, e.g., greater than 15,000 feet, or in geothermally active formations, temperatures may be such that thermal decomposition of certain drilling fluid additives occurs, which can cause detrimental changes in viscosity and flow characteristics that negatively affect the overall drilling operation.

Under HTHP conditions, polymeric materials used to viscosify wellbore fluids and provide a measure of fluid loss control may degrade, causing changes in the rheology of the fluid and may place additional strain on wellbore equipment. Exposure to HTHP conditions can have a detrimental effect on viscosifying agents, resulting in a loss in viscosity of the fluid at high temperatures. A breakdown of the rheology can limit or eliminate the ability of the wellbore fluid to suspend solids entrained within it (such as drill cuttings) and may lead to settlement, loss in fluid density, possible blowout of the well, or the like. Additionally, because the fluid loss control mechanism of the present fluids uses the LSRV, a breakdown of rheology can also cause fluid loss to the formation.

In some embodiments, wellbore fluid additives in accordance with the present disclosure may also exhibit enhanced cleanup properties, and allow for use as brine viscosifiers and fluid loss additives in wellbore operations that may be sensitive to the amount of formation damage caused by standard drilling fluid additives. To this end, wellbore fluids and methods in accordance with the present disclosure may be used to treat fluid loss in some embodiments, for example, by formulating a coiled tubing drilling fluid with a crosslinked fluid loss control additive.

Wellbore fluids in accordance with the present disclosure that may be formulated as a coiled tubing drilling fluid and may contain crosslinked fluid loss control additives that provide for fluid loss control and aid in the removal of formation cuttings during drilling, yet may be removed using breaker fluids.

Crosslinked Fluid Loss Control Agent

Wellbore fluid formulations in accordance with the present disclosure may contain crosslinked polymeric fluid loss control agents that may include a copolymer formed from at least one acrylamide monomer and at least one sulfonated anionic monomer. In other embodiments, crosslinked and branched fluid loss control agents may also include higher order copolymers and block copolymers such as terpolymers, quaternary polymers, and the like, including at least one acrylamide monomer, at least one sulfonated anionic monomer, and optionally other monomers as well.

In one aspect, wellbore fluids of the present disclosure incorporate a crosslinked and branched polymeric fluid loss control agent that is formed from at least an acrylamide monomer and a sulfonated anionic monomer. In one or more embodiments, crosslinked and branched fluid loss control agents may include polymers and copolymers synthesized from a mixture of monomers that may include acrylamide-based monomers. Acrylamide-based monomers in accordance with the present disclosure may play a role in creating an effective and high temperature stable fluid loss control agents, enhancing the fluid's high temperature endurance. In addition to unsubstituted acrylamide monomers, acrylamide-based monomers may also include N-substituted acrylamides, such as alkylacrylamides, N-methylol, N-isopropyl, diacetone-acrylamide, N-alkyl acrylamide (where alkyl is $C_1$ to $C_{14}$), N,N-dialkyl acrylamides (where alkyl is $C_1$ to $C_{14}$), N-cycloalkane acrylamides, combinations of the above and related compounds.

The crosslinked fluid loss control agents may also contain one or more sulfonated anionic monomers. While not limited to a particular theory, incorporation of anionic monomers may increase stability when added to a copolymer by repelling negatively charged hydroxide ions that promote hydrolysis of the acrylamide moiety of the polymer. Sulfonated anionic monomers, such as 2-acrylamide-2-methyl-propanesulfonic acid (AMPS®), a trademark of the Lubrizol Corporation—also referred to as acrylamide tertiary butyl sulfonic acid (ATBS), vinyl sulfonate, styrene sulfonic acid, and the like, may provide tolerance to divalent cations such as calcium and magnesium encountered in drilling fluids. Thus, the incorporation of sulfonated anionic monomers may result in an improved thermally stable fluid loss control agent for divalent cation systems, including brine based drilling fluids. Depending upon the reactivity ratio and the end use of the polymer, other sulfonated monomers may also be utilized for preparing an effective fluid loss control agent.

Further, it is also within the scope of the present disclosure that other monomers can be incorporated into the crosslinked polymer composition depending upon the end use of the polymer or the type of aqueous base drilling fluid. For example, lipophilic monomers, such as isobornyl methacrylate, 2-ethyl hexyl acrylate, N-alkyl and N,N-dialkyl acrylamide, styrene and the like can be incorporated to improve the performance of the polymer in high brine containing drilling fluids. Also, to make it more tolerant to other electrolytes, anionic monomers, such as maleic acid, tetrahydrophthalic acid, fumaric acid, acrylic acid and the like can be incorporated into the crosslinked polymers.

In one or more embodiments, crosslinked fluid loss control agents may contain covalent intermolecular crosslinking depending on the desired functional characteristics of the polymer. In one or more embodiments, the extent of crosslinking may be selected to maximize the viscosity of the resulting polymer in solution. In one or more embodiments, a crosslinked fluid loss control agent may exhibit a bell-curve type response for its viscosity in solution as the quantity of crosslinker used to crosslink the co-polymer is increased. That is, the viscosity initially increases as the quantity of crosslinker (and thus the crosslinks) are increased until a peak viscosity is reached, at which point the viscosity decreases and eventually results in a substantially zero slope as the quantity of crosslinker is further increased. In one or more embodiments, the crosslinked fluid loss control agent used in the fluid of the present disclosure may be synthesized with an amount of crosslinker, and thus extent of crosslinking, so that its viscosity response is in the higher viscosity region of the bell-curve described above. For example, in one or more embodiments, the extent of crosslinking in the crosslinked fluid loss control agent may be selected so that the viscosity of fluid loss control agent is within a peak viscosity response of the viscosity response curve (created by plotting viscosity as a function of crosslinker under otherwise constant conditions). In one or more embodiments, the peak viscosity response may be defined as the amount of crosslinker that correlates to the peak amount plus or minus the amount of crosslinker that correlates to up to 75% of the area under the viscosity response curve that terminates upon reaching substantially zero slope. In more particular embodiments, the amount of crosslinker may be that which correlates to within 50%, or in some embodiments 25%, of the area under the viscosity response curve.

In one or more embodiments, the peak viscosity response may be expressed as the amount of crosslinker that correlates to the peak amount plus or minus the amount of crosslinker that correlates to 1.5 standard deviations from the peak amount. In more particular embodiments, the amount of crosslinker correlates to the peak amount plus or minus the amount of crosslinker that correlates to 1.0 standard deviations from the peak amount or from 0.5 standard deviations in even more particular embodiments. Further, in one or more embodiments, the peak viscosity response may be expressed as the amount of crosslinker that correlates to the peak amount plus or minus 50% of the peak amount. In more particular embodiments, the amount of crosslinker is the peak amount plus or minus 30% or 20% of the peak amount. Further, based on the above, one of ordinary skill in the art would appreciate that the breadth of the amount of crosslinker (and selection of amount of crosslinker) may depend, for example, on the shape of the viscosity response curve and the desired rheological properties for the wellbore fluid and its particular application.

Crosslinking may be achieved, for example, by incorporation of crosslinking monomers such as methylenebisacrylamide, divinyl benzene, allylmethacrylate, tetra allyloxethane or other allylic bifunctional monomers. The crosslinked fluid loss control agent may have a percentage of intermolecular crosslinking that ranges from 0.25% to 10% in some embodiments, from 0.5% to 5% in other embodiments, and from 0.75% to 2.5% in other embodiments.

Wellbore fluids of the present disclosure may also exhibit temperature stability up to 330° F. in some embodiments, or greater that 330° F. in other embodiments. For example, in one or more embodiments, wellbore fluids of the present disclosure may exhibit temperature stability up to 300° F., up to 330° F., up to 350° F., up to 400° F., up to 425° F., or up to 450° F. Temperature stability may be described herein as the ability of the fluid to maintain suitable rheology at the temperature indicated above for at least five days. In one or more embodiments, a wellbore fluid of the present disclosure may exhibit low end rheology (i.e., rheology at 3 and 6 rpm) that does not deviate by more than 30 percent under the elevated temperature conditions indicated above when compared to the low end rheology at temperatures below about 250° F. In one or more embodiments, the low shear rate viscosity at 3 rpm, when tested at 120° F., for fluids according to the present disclosure may be at least 30,000 centipoise. In one or more embodiments, crosslinked fluid loss control additives may be added to a wellbore fluid at a concentration that that ranges from a lower limit selected from the group of 0.5, 1, 2.5, and 3 lb/bbl, to an upper limit selected from the group of 5, 10, 12, and 15 lb/bbl, where the concentration may range from any lower limit to any upper limit. The amount needed will vary, of course, depending upon the type of wellbore fluid, contamination, and temperature conditions. Further, in one or more embodiments, the present fluid may have a plastic viscosity of less than 20 centipoise, measured at 120° F., or less than 15 centipoise or less than 10 centipoise in particular embodiments.

In one or more embodiments, the polymeric fluid loss control agent may have an average molecular weight that ranges from a lower limit selected from the group of 250, 500, and 1,000 Da, to an upper limit selected from the group of 100, 250, 500, and 1,000 kDa, where the molecular weight may range from any lower limit to any upper limit.

As used herein, molecular weight refers to weight average molecular weight ($M_w$) unless indicated otherwise.

In one or more embodiments, crosslinked fluid loss control agents may be a copolymer having a ratio of acrylamide monomer and sulfonated anionic monomer that ranges from 0.5:1 to 10:1. In some embodiments, a ratio of acrylamide monomer and sulfonated anionic monomer may range from 1:1 to 5:1.

Base Fluids

In one or more embodiments, crosslinked fluid loss control additives in accordance with the present disclosure may be hydrated by their simple addition to a base fluid. For example, the crosslinked fluid loss control additives may be hydrated by free water upon their addition to water or a brine used a base fluid. In one or more embodiments, the fluid of the present disclosure may have an aqueous base fluid, the fluid being a monophasic fluid, in which the above mentioned polymers are included. The aqueous medium of the present disclosure may be water or brine. In those embodiments of the disclosure where the aqueous medium is a brine, the brine is water comprising an inorganic salt or organic salt. The salt may serve to provide desired density to balance downhole formation pressures, and may also reduce the effect of the water based fluid on hydratable clays and shales encountered during drilling. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, zinc, potassium, strontium, and lithium, salts of chlorides, bromides, carbonates, iodides, chlorates, bromates, formates, nitrates, oxides, phosphates, sulfates, silicates, and fluorides. Salts that may be incorporated in a brine include any one or more of those present in natural seawater or any other organic or inorganic dissolved salts.

In some embodiments, the fluid may be a divalent halide is selected from the group of alkaline earth halides or zinc halides. The brine may also comprise an organic salt, such as sodium, potassium, or cesium formate. Inorganic divalent salts include calcium halides, such as calcium chloride or calcium bromide. Sodium bromide, potassium bromide, or cesium bromide may also be used. The salt may be chosen for compatibility reasons, i.e. where the reservoir drilling fluid used a particular brine phase and the completion/clean up fluid brine phase is chosen to have the same brine phase.

Additives

In one or more embodiments, the HTHP coiled tubing fluids of the present disclosure may be substantially solids free. For example, in one or more embodiments, the fluid may contain less than 2 wt % solids, and less than 1 wt % solid in more particular embodiments. In one or more embodiments, there may be no added solids.

In one embodiment, the drilling fluid of the disclosure may further contain other additives and chemicals that are known to be commonly used in oilfield applications by those skilled in the art. Such additives may include thinners, gelling agents, shale inhibitors, pH buffers, etc.

Wellbore fluids of the present disclosure may contain other materials needed to form complete drilling fluids. Such other materials optionally may include, for example: additives to reduce or control low temperature rheology or to provide thinning, additives for enhancing viscosity, additives for high temperature high pressure control, and emulsion stability.

Examples of wellbore fluid thinners that may be used include lignosulfonates, lignitic materials, modified lignosulfonates, polyphosphates and tannins. In other embodiments low molecular weight polyacrylates can also be added as thinners. Thinners are added to a drilling fluid in order to reduce flow resistance and gel development. Other functions performed by thinners include the reduction of filtration and cake thickness, to counteract the effects of salts, to minimize the effects of water on the formations drilled, to emulsify oil in water, and to stabilize mud properties at elevated temperatures.

In one or more embodiments, an amine stabilizer may be used as a pH buffer and/or thermal extender to prevent acid-catalyzed degradation of polymers present in the fluid. A suitable amine stabilizer may include triethanolamine; however, one skilled in the art would appreciate that other amine stabilizers such as methyldiethanol amine (MDEA), dimethylethanol amine (DMEA), diethanol amine (DEA), monoethanol amine (MEA), cyclic organic amines, sterically hindered amines, amides of fatty acid, or other suitable tertiary, secondary, and primary amines and ammonia could be used in the fluids of the present disclosure.

In some embodiments, the amine stabilizer may be commercially available amine stabilizers such as PTS-200, or polyether amines polyether amines such as the JEFFAMINE series of polyether amines including Jeffamine D-230, all of which are available from M-I L.L.C. (Houston, TX). Amine stabilizers may be added to a wellbore fluid in accordance with the present disclosure at a concentration that ranges from 0.1% to 10% by weight of the wellbore fluid in some embodiments, and from 0.5% to 5% by weight of the wellbore fluid in other embodiments. Further, is also envisioned that the fluid may be buffered to a desirable pH using, for example, magnesium oxide. The compound serves as to buffer the pH of the drilling fluid and thus maintain the alkaline conditions under which the process of hydrolysis or degradation of the polymers is retarded.

The fluids may be formulated or mixed according to various procedures; however, in particular embodiments, the polymeric fluid loss control agent of the present disclosure may be yielded in fresh water prior to be added to a brine (or vice versa). Thus, after the polymer yields in fresh water, a brine (such as a divalent halide) may be combined with the yielded polymer. The gelling agent may be added to the yielded polymer either before, after, or simultaneous with the brine.

Upon mixing, the fluids of the present embodiments may be used in coiled tubing drilling operations. Drilling techniques are known to persons skilled in the art and involve pumping a drilling fluid into a wellbore through an earthen formation. The fluids of the present embodiments have particular application for use in high temperature environments. The drilling fluid formulations disclosed herein may possess high thermal stability, having particular application for use in environments of up to 425° F. or 450° F. In yet another embodiment, the fluids of the present disclosure are thermally stable for at least 16 hours, or for at least two days, or for at least five days at the elevated temperatures indicated above.

The fluids of the present disclosure may find utility in coiled tubing applications where the high temperature stability of the fluid could be useful. Coiled tubing applications use a long metal pipe that can be spooled on large reels in a variety of downhole operations including well interventions, production operations, and in some instances drilling. Many of the operations that use coiled tubing may also be done by wireline. However, coiled tubing has the advantage of being able to be pushed into the wellbore rather than the reliance on gravity with wireline and also fluids may be pumped through the coiled tubing. In embodiments where the fluids of the present disclosure are used in coiled tubing applications a lubricant may be added to the wellbore fluids to reduce friction although, the crosslinked fluid-loss control additive may effectively act as a friction reducer when used in coiled tubing applications.

Breaker Fluids

After completion of the drilling or completion process, fluid residue deposited by drilling fluids or the fluid remaining in the well may be broken by application of a breaker fluid that degrades the constituents of the fluid, specifically to reduce the low shear rate viscosity of the fluid. The breaker fluid may be circulated in the wellbore during or after the performance of the at least one completion operation. In other embodiments, the breaker fluid may be circulated either before, during, or after a completion operation has commenced to destroy the integrity of and clean up residual drilling fluids remaining inside production tubing, or on the walls of the worked over well. The breaker fluid may contribute to the degradation and removal of fluid in the wellbore to minimize the possibility of negatively impacting production. Upon cleanup of the well, the well may then be converted or re-converted to production.

In one or more embodiments, the breaker may include at least one dicarboxylic acid, either in acid form or in an esterified form. It is also envisioned that mixtures of acids or mixtures of hydrolyzable esters of dicarboxylic acids may be used. In one or more embodiments, the mixtures of hydrolysable esters of dicarboxylic acids may contain $C_3$ to $C_8$ dicarboxylic acids. In one or more embodiments, the mixture of hydrolyzable esters of dicarboxylic acids may include about 57-67 wt. % dimethyl glutarate, 18-28 wt. % dimethyl succinate, and 8-22 wt. % dimethyl adipate.

In some instances, it may also be desirable to include an oxidant in the breaker fluid, to further aid in breaking or degradation of polymeric additives present in a filter cake. The oxidants may be used with a coating to delay their release or they may be used without a coating. Examples of such oxidants may include any one of those oxidative breakers known in the art to react with polymers such as polysaccharides to reduce the viscosity of polysaccharide-thickened compositions or disrupt filter cakes. Such compounds may include bromates, peroxides (including peroxide adducts), other compounds including a peroxy bond such as persulfates, perborates, percarbonates, perphosphates, and persilicates, and other oxidizers such as hypochlorites. In one or more embodiments, the oxidant may be included in the breaker fluid in an amount from about 1 ppb to 10 ppb. In one or more particular embodiments, the breaker is a peroxide such as Tertiary Butyl Hydro Peroxide.

In general, the base fluid of a breaker fluid may be an aqueous medium selected from water or brine. In those embodiments of the disclosure where the aqueous medium is a brine, the brine is water comprising an inorganic salt or organic salt. The salt may serve to provide desired density to balance downhole formation pressures. In various embodiments of the breaker fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, zinc, potassium, strontium, and lithium, salts of chlorides, bromides, carbonates, iodides, chlorates, bromates, formates, nitrates, oxides, phosphates, sulfates, silicates, and fluorides. Salts that may be incorporated in a brine include any one or more of those present in natural seawater or any other organic or inorganic dissolved salts.

In some embodiments, the base fluid for the breaker may be a divalent halide is selected from the group of alkaline earth halides or zinc halides. The brine may also comprise an organic salt, such as sodium, potassium, or cesium formate. Inorganic divalent salts include calcium halides, such as calcium chloride or calcium bromide. Sodium bromide, potassium bromide, or cesium bromide may also be used. The salt may be chosen for compatibility reasons, i.e. where the drilling fluid used a particular brine phase and the breaker fluid brine phase is chosen to have the same brine phase.

In one or more embodiments, before, during, or after a completion operation has started or upon conclusion of all completion operations, the circulation of a breaker fluid may be used to at least partially reduce the viscosity of the fluid remaining on the wellbore walls. In one or more other embodiments, the breaker may be provided in as an internal component in the coiled tubing drilling fluid. For example, in such embodiments, it is envisioned that the breaker may be encapsulated or otherwise inactivated (such as through use of an ester of an acid). When an internal breaker is used, the breaker component can be added to and mixed into the drilling fluid at the mud plant, whereas an external breaker may be added at the well.

It should be appreciated that the amount of delay between the time when a breaker fluid according to the present disclosure is introduced to a well and the time when the fluids have had the desired effect of breaking/degrading/dispersing the filter cake may depend on several variables. One of skill in the art should appreciate that factors such as the downhole temperature, concentration of the components in the breaker fluid, pH, amount of available water, drilling fluid composition, etc. may all have an impact. For example downhole temperatures can vary considerably from 100° F. to over 400° F. depending upon the formation geology and downhole environment. However, one of skill in the art via trial and error testing in the lab should easily be able to determine and thus correlate downhole temperature and the time of efficacy of for a given formulation of the breaker fluids disclosed herein. With such information one can predetermine the time period necessary to shut-in a well given a specific downhole temperature and a specific formulation of the breaker fluid.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method of drilling by coiled tubing, comprising:
   extending a coiled tubing with a drill bit at an end thereof through a production string extending through a wellbore;
   pumping a wellbore fluid through the coiled tubing, the wellbore fluid comprising:
      a base fluid; and
      a crosslinked and branched polymeric fluid loss control agent formed from at least an acrylamide monomer, a sulfonated anionic monomer, an acrylate monomer, and an additional anionic monomer;
      wherein the acrylate monomer is selected from the group consisting of isobornyl methacrylate and 2-ethyl hexyl acrylate;
      wherein the additional anionic monomer is selected from the group consisting of maleic acid, tetrahydrophthalic acid, fumaric acid, and acrylic acid;
      wherein the wellbore fluid has a low shear rate viscosity, measured at 120° F. at 3 rpm, of at least 20,000 centipoise;
   drilling a wellbore using the drill bit at the end of the coiled tubing during the pumping;
   further comprising:
   at least partially reducing the low shear rate viscosity of the wellbore fluid wherein the viscosity reduction occurs by a breaker comprising at least one dicarboxylic acid and a mixture of hydrolyzable esters comprising 57-67 wt. % dimethyl glutarate, 18-28 wt. % dimethyl succinate, and 8-22 wt. % dimethyl adipate;
   wherein the viscosity reduction occurs by a breaker further comprising a tertiary butyl hydro peroxide in an amount from 1 ppb to 10 ppb;
   wherein the fluid loss control agent is present in the wellbore fluid at a concentration of about 0.5 to 15 lb/bbl; wherein the fluid loss control agent has a percentage of intermolecular crosslinking that ranges from 0.25 to 10%.

2. The method of claim 1, further comprising:
   initiating production of hydrocarbons from the reservoir.

3. The method of claim 1, wherein the acrylamide monomer is at least one selected from unsubstituted acrylamide, alkylacrylamides, N-methylol acrylamide, N-isopropyl acrylamide, diacetone-acrylamide, N-alkyl acrylamide, where alkyl is $C_1$ to $C_{14}$, N,N-dialkyl acrylamides, where alkyl is $C_1$ to $C_{14}$, N-cycloalkane acrylamides, or combinations thereof.

4. The method of claim 1, wherein the sulfonated anionic monomer is selected from 2-acrylamide-2-methyl-propane-sulfonic acid, vinyl sulfonate, or styrene sulfonic acid.

* * * * *